(12) United States Patent  (10) Patent No.: US 7,904,477 B2
Jung et al.  (45) Date of Patent: Mar. 8, 2011

(54) OBJECT VERIFICATION ENABLED NETWORK (OVEN)

(75) Inventors: Namsoon Jung, State College, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 505 days.

(21) Appl. No.: 11/999,649

(22) Filed: Dec. 6, 2007

(65) Prior Publication Data

US 2008/0147725 A1 Jun. 19, 2008

Related U.S. Application Data

(60) Provisional application No. 60/874,585, filed on Dec. 13, 2006.

(51) Int. Cl.
*G06F 7/00* (2006.01)
*G06F 17/30* (2006.01)

(52) U.S. Cl. .......................... 707/790; 707/794; 707/797

(58) Field of Classification Search .................... 707/100
See application file for complete search history.

(56) References Cited

U.S. PATENT DOCUMENTS

2003/0120824 A1\* 6/2003 Shattuck et al. .............. 709/313

OTHER PUBLICATIONS

Tan, A.-H. (1999). Text mining: The state of the art and the challenges. In Proceedings of PAKDD Workshop on Knowledge Discoverery from Advanced Databases, pp. 65-70.\*

N. Krahnstoever, et al., "A real-time framework for natural multimodal interaction with large screen displays," 2002, Proceedings of the Fourth IEEE International Conference on Multimodal Interfaces, Oct. 14-16, 2002, pp. 349-354.
R. Sharma, et al., Speech-gesture driven multimodal interfaces for crisis management, Sep. 2003, Proceedings of the IEEE, vol. 91, No. 9, pp. 1327-1354.
F. Flippo, et al., "A framework for rapid development of multimodal interfaces," 2003, Proceedings of the Fifth International Conference on Multimodal Interfaces, Nov. 5-7, 2003, pp. 109-116.

\* cited by examiner

*Primary Examiner* — Jay A Morrison

(57) ABSTRACT

The present invention is a method and system for handling a plurality of information units in an information processing system, such as a multimodal human computer interaction (HCI) system, through verification process for the plurality of information units. The present invention converts each information unit in the plurality of information units into verified object by augmenting the first meaning in the information unit with a second meaning and expresses the verified objects by object representation for each verified object. The present invention utilizes a processing structure, called polymorphic operator, which is capable of applying a plurality of relationships among the verified objects based on a set of predefined rules in a particular application domain for governing the operation among the verified objects. The present invention is named Object Verification Enabled Network (OVEN). The OVEN provides a computational framework for the information processing system that needs to handle complex data and event in the system, such as handling a huge amount of data in a database, correlating information pieces from multiple sources, applying contextual information to the recognition of inputs in a specific domain, processing fusion of the multiple inputs from different modalities, handling unforeseen challenges in deploying a commercially working information processing system in a real-world environment, and handling collaboration among multiple users.

26 Claims, 12 Drawing Sheets

```xml
<RULE TYPE="AND">
 <OBJECT TYPE="LITERAL">INPUT_VAL_AND_0</OBJECT>
 <OBJECT TYPE="LITERAL">INPUT_VAL_AND_1</OBJECT>
 <RESULT TYPE="LITERAL">THEN_RESULT_VAL_AND_0</RESULT>
 <RESULT TYPE="LITERAL">ELSE_RESULT_VAL_AND_0</RESULT>
</RULE>
- <RULE TYPE="OR">
 <OBJECT TYPE="NUMERAL">INPUT_VAL_OR_0</OBJECT>
 <OBJECT TYPE="NUMERAL">INPUT_VAL_OR_1</OBJECT>
 <RESULT TYPE="NUMERAL">THEN_RESULT_VAL_OR_0</RESULT>
 <RESULT TYPE="NUMERAL">ELSE_RESULT_VAL_OR_0</RESULT>
</RULE>
- <RULE TYPE="NOT">
 <OBJECT TYPE="LITERAL">INPUT_VAL_NOT_0</OBJECT>
 <RESULT TYPE="LITERAL">RESULT_VAL_NOT_0</RESULT>
</RULE>
- <RULE TYPE="NESTED_IF">
 <OBJECT TYPE="CONDITIONAL">
  INPUT_VAL_NESTED_IF_0
 </OBJECT>
 <RESULT TYPE="NUMERAL">
  THEN_RESULT_VAL_NESTED_IF_0
 </RESULT>
 <RESULT TYPE="NUMERAL">
  ELSE_RESULT_VAL_NESTED_IF_0
 </RESULT>
</RULE>
```

Fig. 5

```
<RULE> IF  'ENTITY1' [BOOLEAN LOGIC]
          'ENTITY2' [BOOLEAN LOGIC]
       ... [BOOLEAN LOGIC] 'ENTITY N'
      THEN   THEN-RESULT
      { ELSE    ELSE-RESULT } // OPTIONAL
</RULE>
```

Fig. 7

| TIME | PROCESS TYPE | ATTRIBUTE | VALUE / PROCESS |
|---|---|---|---|
| $t_i$ | USER (SPEECH) | SPEECH SEGMENT | "SELECT THE FLOODED AREA." |
| | | TIME | $t_i$ |
| | USER (GESTURE) | GESTURE TYPE | "NO GESTURE" |
| | | COORDINATE(S) | $X_i, Y_i$ |
| | | TIME | $t_i$ |
| $t_{i+1}$ | SYSTEM (SPEECH RECOGNITION) | INTERNAL STATE | CORRECTLY UNDERSTOOD |
| | | UNDERSTOOD SEGMENT | "SELECT THE FLOODED AREA." |
| | | SPEECH UTTERANCE TIME | $t_i$ |
| | | SYSTEM PROCESS TIME | $t_{i+1}$ |
| | SYSTEM (GESTURE RECOGNITION) | INTERNAL STATE | CORRECTLY RECOGNIZED |
| | | GESTURE TYPE | "NO GESTURE" |
| | | COORDINATE(S) | $X_i, Y_i$ |
| | | GESTURE INITIATION TIME | $t_i$ |
| | | SYSTEM PROCESS TIME | $t_{i+1}$ |
| $t_{i+2}$ | SYSTEM (VISUALIZATION AND AUDIO RESPONSE) | VISUALIZATION TYPE | USE DIFFERENT COLOR CODE FOR THE SELECTED AREA |
| | | SYSTEM RESPONSE TIME | $t_{i+2}$ |
| | | AUDIO RESPONSE TYPE | "THE AREA IS SELECTED." |
| | | SYSTEM RESPONSE TIME | $t_{i+2}$ |

| TIME | PROCESS TYPE | ATTRIBUTE | VALUE / PROCESS |
|---|---|---|---|
| $t_k$ | USER (SPEECH) | SPEECH SEGMENT | "HIGHLIGHT THIS AREA." |
| | | TIME | $t_k$ |
| | USER (GESTURE) | GESTURE TYPE | "POINT GESTURE" |
| | | COORDINATE(S) | $X_k, Y_k$ |
| | | TIME | $t_k$ |
| $t_{k+1}$ | SYSTEM (SPEECH RECOGNITION) | INTERNAL STATE | PARTIALLY UNDERSTOOD |
| | | UNDERSTOOD SEGMENT | "HIGHLIGHT ??? AREA." |
| | | SPEECH UTTERANCE TIME | $t_k$ |
| | | SYSTEM PROCESS TIME | $t_{k+1}, t_{k+2}$ |
| | SYSTEM (GESTURE RECOGNITION) | INTERNAL STATE | CORRECTLY RECOGNIZED |
| | | GESTURE TYPE | "POINT GESTURE" |
| | | COORDINATE(S) | $X_k, Y_k$ |
| | | GESTURE INITIATION TIME | $t_k$ |
| | | SYSTEM PROCESS TIME | $t_{k+1}$ |
| $t_{k+2}$ | SYSTEM (COMM. WITH REASONING MODULE) | N/A | LOOKING UP THE CONVERSATION HISTORY |
| | | N/A | PATTERN MATCHING IN KEYWORD TABLE |
| $t_{k+3}$ | SYSTEM (VISUALIZATION AND AUDIO RESPONSE) | VISUALIZATION TYPE | USE DIFFERENT COLOR |
| | | SYSTEM RESPONSE TIME | $t_{k+3}$ |
| | | AUDIO RESPONSE TYPE | "THE AREA IS HIGHLIGHTED" |
| | | SYSTEM RESPONSE TIME | $t_{k+3}$ |

Fig. 9B

| SEM. CLASS | REG. KEYWORD | CONTEXT TYPE | SYNTACTIC FORMAT | EXAMPLE |
|---|---|---|---|---|
| SG1 | ZOOM | SPATIAL | KEYWORD {SPATIAL INFO} | "ZOOM HERE" |
| SG2 | WHEN | ASSOC. TEMPORAL | KEYWORD + {ASSOCIATED TEMPORAL INFO} | "WHEN DID IT START" |
| SG3 | DRAW, SEND, MOVE | SPATIAL UNARY | KEYWORD {SPATIAL INFO} | "DRAW A CIRCLE" |
| SG3 | DRAW, SEND, MOVE | SPATIAL BINARY | KEYWORD {SPATIAL INFO}, {SPATIAL INFO} | "DRAW A LINE FROM HERE TO THERE" |
| SG4 | HIGHLIGHT | SPATIAL | KEYWORD {SPATIAL INFO} | "HIGHLIGHT THIS AREA" |
| SG4 | HIGHLIGHT | SYMBOLIC | KEYWORD {SYMBOLIC INFO} | "HIGHLIGHT THIS" |
| SG5 | SELECT, SHOW | SPATIAL UNARY | KEYWORD {SPATIAL INFO} | "SELECT THIS AREA" |
| SG5 | SELECT, SHOW | SPATIAL BINARY | KEYWORD {SPATIAL INFO}, {SPATIAL INFO} | "SELECT FROM HERE TO THERE" |
| SG5 | SELECT, SHOW | SYMBOLIC | KEYWORD {SYMBOLIC INFO} | "SELECT THE RECTANGLE" |
| SG5 | SELECT, SHOW | TEXTUAL | KEYWORD {TEXTUAL INFO} | "SELECT THIS" "SHOW ME THIS" |

Fig.10

```
...
<RULE> IF    'HIGHLIGHT'
             [AND]
             'PREVIOUS CONTEXT IS SPATIAL'
       THEN  'HIGHLIGHT {SPATIAL INFO}'
       ELSE  'HIGHLIGHT {SYMBOLIC INFO}'
</RULE>

<RULE> IF    'HIGHLIGHT {SPATIAL INFO}'
             [AND]
             'POINT GESTURE'
             [AND]
             'COORDINATE(S): (X, Y)'
       THEN  'SEND A MESSAGE TO GESTURE RECOGNITION'
             [AND]
             'HIGHLIGHT COORDINATE(S): (X, Y) '
       { ELSE   ELSE-RESULT } // OPTIONAL
</RULE>
...
```

Fig.11

OBJECT VERIFICATION ENABLED NETWORK (OVEN)

CROSS-REFERENCE TO RELATED APPLICATIONS

This application claims the benefit of U.S. Provisional Patent Application No. 60/874,585, filed Dec. 13, 2006.

FEDERALLY SPONSORED RESEARCH

Not Applicable

SEQUENCE LISTING OR PROGRAM

Not Applicable

BACKGROUND OF THE INVENTION

Field of the Invention

The proposed invention relates to a method and system for processing data and event in an information processing system, such as a multimodal human computer interaction (HCI) system, utilizing a processing structure to apply predefined rules to augmented information objects, providing a feasible solution to the challenges found in deploying the system in the real-world environment, and the present invention is named Object Verification Enabled Network (OVEN).

BACKGROUND OF THE INVENTION

A multimodal human computer interaction (HCI) system is an exemplary information processing system that handles complex information units. An example can be found in a real-time framework for natural multimodal interaction by N. Krahnstoever, et al., A real-time framework for natural multimodal interaction with large screen displays, Multimodal Interfaces, 2002. Proceedings, Fourth IEEE International Conference, 14-16 Oct. 2002 Page(s): 349-0.354 (hereinafter N. Krahnstoever, et al.).

Fusion of the multiple inputs from different modalities is one of the most important steps in such a multimodal human computer interaction (HCI) system. R. Sharma, et al., Speech-gesture driven multimodal interfaces for crisis management, Proceedings of the IEEE, Volume 91, Issue 9, September 2003 Page(s): 1327-1354 (hereinafter R. Sharma, et al.), shows architecture of a possible fusion strategy, in which a probabilistic evaluation of all possible speech gesture combinations is suggested as a better estimation of the users' intention than a single input modality. R. Sharma, et al., also discusses semantic analysis of multimodal input by the application of static and dynamic contexts.

One importance in a multimodal HCI system lies in the fact that the new interaction paradigm by the fusion can ease the information bottleneck. Partially, the strength comes from its capability to process huge amounts of data in a more efficient way than the conventional interface as discussed in R. Sharma, et al. For example, a multimodal HCI system could process a descriptive command in one step using a speech recognition input modality, which could otherwise take multiple steps using the conventional interface, such as a keyboard or a mouse. The popularity of automatic speech recognition input modality by a computer-based machine is also partially due to this fact. As discussed in R. Sharma, et al., the fusion of the gesture recognition and speech recognition provides further enhanced performance in the information processing system.

Especially with the increasing popularity of the web-applications on the Internet and the growing size of its data, the usage of a multimodal HCI system can be an efficient solution for dealing with the huge amount of data on the Internet.

In addition to the huge amount of data, users often suffer from the disorganization of data while using an information processing system, such as the multimodal HCI system, with a large database. This leads us to the importance of data organization and mining.

Consequently, one of the questions that can be produced with the usage of the multimodal HCI system or an information processing system in general is how to handle the data efficiently and in an appropriate manner, especially for a complex application or situation. For example, in the following cases, the need for an intelligent approach for handling such complex situations highly increases.

- when the information processing system is intended for multiple users requiring an efficient method for collaboration among the users,
- when the nature of the goal for the given tasks is complex, or
- when the multiple users interact with the system through multiple human languages in a highly distributed computing environment.

Therefore, it is an objective of the present invention to provide an intelligent information handling approach for an information processing system, such as a multimodal HCI system, which could face a situation of handling the information in a complex application scenario.

It is a further objective of the present invention to provide a novel approach to handle the fusion of multimodal inputs in the case of a multimodal HCI system.

It is a further objective of the present invention to provide a novel and intelligent tool for the data mining of a database, especially an uncharacteristic or heterogeneous one, since object verification in the present invention is also closely related to database construction and how to model data.

In addition to the above mentioned problems for handling the key processes, such as gesture and speech recognition, in a multimodal HCI system, it is found that deploying a commercially working multimodal HCI system in a real-world environment could pose many challenges. Converting a multimodal HCI system from a lab-based prototype stage with pure numerical formulas to a working commercial product requires well-designed engineering solutions for the unforeseen practical problems in the field. It is a challenging task to the researchers and engineers. Ad-hoc solutions, such as introducing additional parameters, thresholds, conditions, or error handling pieces of code, are sometimes used as quick solutions to the challenges in a real-world environment. However, the ad-hoc solutions are often non-scalable and inconsistent from one system to another.

The OVEN can provide a robust, scalable, and organized framework, which efficiently integrates these ad-hoc solutions into a manageable tool. Handling the practical challenges found in the key modalities in a commercially working multimodal HCI system is one of the tasks where the OVEN can contribute well.

Therefore, it is another objective of the present invention to provide a scientific way of analyzing and organizing the accumulated experiences and knowledge while deploying an information processing system, such as the multimodal human computer interaction (HCI) system, to the real-world environment.

From the architectural point of view for the multimodal HCI system, F. Flippo, et al., A Framework for Rapid Development of Multimodal Interfaces, In Proceedings of the 5th International Conference on Multimodal Interfaces (ICMI '03), Pages: 109-116, 2003 (hereinafter F. Flippo, et al.), suggested a multimodal framework for rapid development of multimodal interfaces, by using an application-independent fusion technique, based on the idea that a large part of the code in a multimodal system can be reused. In F. Flippo, et al., the key idea for the application-independent fusion technique is to have separation of three tasks in the multimodal system design. The three separated tasks, as defined in their paper, are obtaining data from modalities, fusing that data to come to an unambiguous meaning, and calling application code to take an action based on that meaning. In F. Flippo, et al., a semantic parse tree with time stamps is used for the fusion, which maps natural language concepts to application concepts, and the ambiguity resolving agents in this process use contextual information from the context provider, either from an external sensor, such as a gaze tracker, or from more abstract data sources, such as dialog history.

However, F. Flippo, et al., are clearly foreign to the concepts of augmenting the information units in an information processing system through a verification process and applying a polymorphic processing structure to the verified objects as disclosed in the present invention. As a matter of fact, the object verification approach in the present invention can enhance the performance of an application-independent framework and architecture in a multimodal HCI system, such as that of F. Flippo, et al.

Therefore, it is another objective of the present invention to provide a novel and efficient information handling method to the framework and architecture of such an information processing system, which F. Flippo, et al. lack.

SUMMARY

The Object Verification Enabled Network (OVEN) comprises a way to augment information units and to process the information units through a processing structure, called a polymorphic operator, in an information processing system, such as a multimodal human computer interaction (HCI) system. In the present invention, the information unit is also called the "object".

Among many different types of information units, the following descriptions in this document will focus on the information unit based on data and event.

First, the object can be an "information unit based on data", which can appear in the input modalities, output representation, or internal processes within the system handled by the processor.

Second, the object can also be an "information unit based on event". The creation of information pieces is often event driven. The OVEN treats each single event, or a combination of such events, as an individual object.

The augmentation of the object by a verification process in the OVEN differentiates the object in the OVEN from a simple information piece or event in an information processing system in general. Furthermore, the term "object" is clearly different from that of the object-oriented programming. The object in the OVEN does not have anything to do with data encapsulation, inheritance, or instantiation in the object-oriented programming.

The information unit is converted into a "verified object", through a verification process in the OVEN. The verification process is a step to give the object an additional meaning based on the characteristics of the object, in which the additional meaning is eventually intended to be the essential meaning or goal-oriented meaning of the object for a particularly intended application domain. Our assumption is that the information unit based on data and event, i.e., an object, may not represent the object's most desired characteristics by itself, especially when the application domain, where the information unit is processed, varies.

In the object verification process, the main characteristics of the object are represented in a single set of the verification information into the verified object, and this representation of the verified object is called object representation (OR). The object representation shows the key concepts of the verified object as the result of the verification, whether the verified object is a simple object or a composite object, i.e., a collection of simple objects. The object representation does not include the object itself, but it is the representation for the verified object according to the verification.

The object representation could comprise heterogeneous data types in a higher-level data structure. The object verification process may need to define an object in multiple concepts, thus as multiple verified objects, depending on the goals of the target processes in the system. In this case, the object can be represented in multiple object representations, not a single object representation, i.e., each of the multiple verified objects will have its own single set of the verification information through the multiple object verification processes. When multiple object representations exist for an object, each of the verified objects is treated differently as a separate verified object, depending on the object representation. Accordingly, their embodiments exist separately in order to avoid ambiguity.

The object verification process is often dependent on the context in which the object resides, although not always. The information about the context can be integrated to the object representation, in case the contextual information plays an important role. The object representation can use any human languages for the literal embodiment of the object representation.

In the case of the object based on data, the object verification is performed primarily for the objects that are closely tied to the goal of the application among possibly numerous objects based on data. The object verification for the objects based on data can be done manually by the expert user prior to using the system, unless the database contains verified objects that had been verified previously. The object verification is selectively processed according to the application goal. We refer to this exercise as the "verification on demand". When there is no verification representation in an object, e.g., the object may not be a verified object, the OVEN treats it as a normal object by default.

In the case of the object based on event, the object verification can be performed automatically by a verification module. For example, when an event is created by the internal processes, such as speech recognition or gesture recognition, the verification module can look at it and verify the event as a verified object. As was the case for the object based on the data, it will be difficult to verify entire objects based on events, especially when the processes for creating and handling events are complex. The number and type of objects based on event, to which the verification module can apply the verification, can be controlled by the rules according to the application goal.

A processing structure, called a polymorphic operator (PO), processes the verified object, based on the predefined rules by the expert user in a particular application domain. Once the object representation is assigned to each verified object and as soon as the system recognizes them, they can be sent to the processing module in the system. Then, the OVEN provides a processing structure, which applies a relationship among the verified objects and produces an outcome from the application of the relationship.

The polymorphic operator can handle both quantifiable and non-quantifiable relationship among the verified objects. The relationship is governed by predefined rules, which are in turn defined by the expert user in a particular application domain, where the system is used. The rule can also define the type and format of the output result caused by the relationship. The rules can exist in a distributed network, so they can be referenced by the system remotely.

The rule can define the relationship among the verified objects at either the information content level or the semantic group level, of the verified object.

When the rule is defined at the information content level, the PO evaluates the value of the verified objects. When the rule is defined at the semantic group level of the verified objects, the PO compares the object representation of the verified objects to the keywords in semantic groups in the rule.

Currently, the architecture for the system, which embodies the concept of the PO and its operation, is designed in such a way that various computational models for the PO can be integrated. Based on the flexibility, regardless of which computational model is used for constructing the PO, the system is designed to provide a framework that connects the driver application to the processing module of the PO.

Once a computational model is selected, the computation is performed through the polymorphic operator. The computational model itself can provide rules, which define the relationship among the verified objects and among their corresponding semantic groups. The POs execute the rules onto the object representations, which match the semantic groups.

The operands are organized in a hierarchical data structure based on an abstraction, such as a semantic tree, which the expert user can construct. Each operand is treated as a node for a semantic group, a group of semantically relevant concepts, in the semantic tree. The node may or may not have the children nodes.

Based on the domain knowledge, an expert can assign a keyword to each semantic group, which represents the key idea of the semantic group. When the rule is defined at the semantic group level of the verified objects, the PO can compare the object representation of the verified objects to the keywords in semantic groups in the rule.

In our current implementation, an exemplary rule is constructed based on the Boolean logic. In the relationship-based reasoning process of the exemplary embodiment, the basic structure of the reasoning of the semantics is a conditional statement. The "if" segment not only holds unary/binary Boolean logic, but also any number of operands in the Boolean logic. In simple cases, basic Boolean logic relationships are used for the reasoning, such as AND, OR, NOT, XOR, NAND, NOR, and NESTED_IF. We can construct highly complicated logic through the composite of the basic Boolean logic and nested "if" statements. In the exemplary embodiment of the present invention, the NESTED_IF allows one-step deeper reasoning, and further recursive processes in deeper levels are avoided currently.

The semantic tree is an abstraction, and it can be used as a basis for defining the relationship in the rules. The data structure of the semantic tree can be Hash, linked list, or tree. A mapping function, similar to a hash function, can be used to match the keyword pattern in the data structure. In our exemplary implementation, a tree is used as the data structure. In the data structure, each node represents a semantic group.

One exemplary data structure of each semantic group node can be the disjoint set structure. According to the disjoint set theory, we can group the semantic group or ungroup the semantic group using the Boolean logic operator. The "grouping" means merge of the multiple nodes in the tree into one semantic group node. This will lead to a more complex reasoning after combining a set of basic Boolean logic. We can devise a divide and conquer algorithm-based approach for reasoning the complex semantics.

A particular embodiment of the OVEN is a collection of networked modules, so that the present invention can extend the information processing system, such as the multimodal HCI paradigm, to embrace the domain of web-based applications along with the standalone applications. In the exemplary embodiment, the OVEN can use remote resources, such as a remote database, in the network environment by a remote verification process for the objects that appear in the network.

In an exemplary embodiment for a multimodal HCI system, the OVEN can utilize the strength of the multimodal HCI system in the distributed web environment. One of its embodiments in such environment is realized as a web application, which facilitates multiple user interaction with multiple languages in a highly distributed computing environment.

One of the objectives of the OVEN is to provide a tool for defining semantics to each event encountered in an interaction with a multimodal HCI system. With the growing complexity of the web environments, the need for a tool that assigns appropriate semantics to each object is also increasing. Usage of such a tool will enable the expert user to construct a well-organized data structure, which will eventually expedite the information processing.

In an exemplary embodiment, the present invention can also be used in applying contextual information to an information processing system. In addition to the effort for better numerical algorithms, attempts for utilizing contextual information for handling information, such as multimodal inputs, in the information processing system can be beneficial in enhancing the performance of the system. The OVEN can provide a scalable and powerful framework for the attempt. In an embodiment of the OVEN, the system can use reasoning modules to apply contextual information to the processes or the set of handlers in the system.

DRAWINGS

Figures

FIG. 5 shows an example of a rule based on the Boolean logic in a XML file.

FIG. 7 shows an exemplary polymorphic operator based on the Boolean logic.

FIG. 9A and FIG. 9B show exemplary processing sequences and conversational segments of a particular interaction in an exemplary application of the OVEN.

FIG. 10 shows an exemplary structure for semantic grouping of keywords, its registered keywords, and the syntactic format.

FIG. 11 shows exemplary rules for processing a command using spatial/gesture contextual information and conversation contextual information.

DETAILED DESCRIPTION OF THE INVENTION

Figure 1:
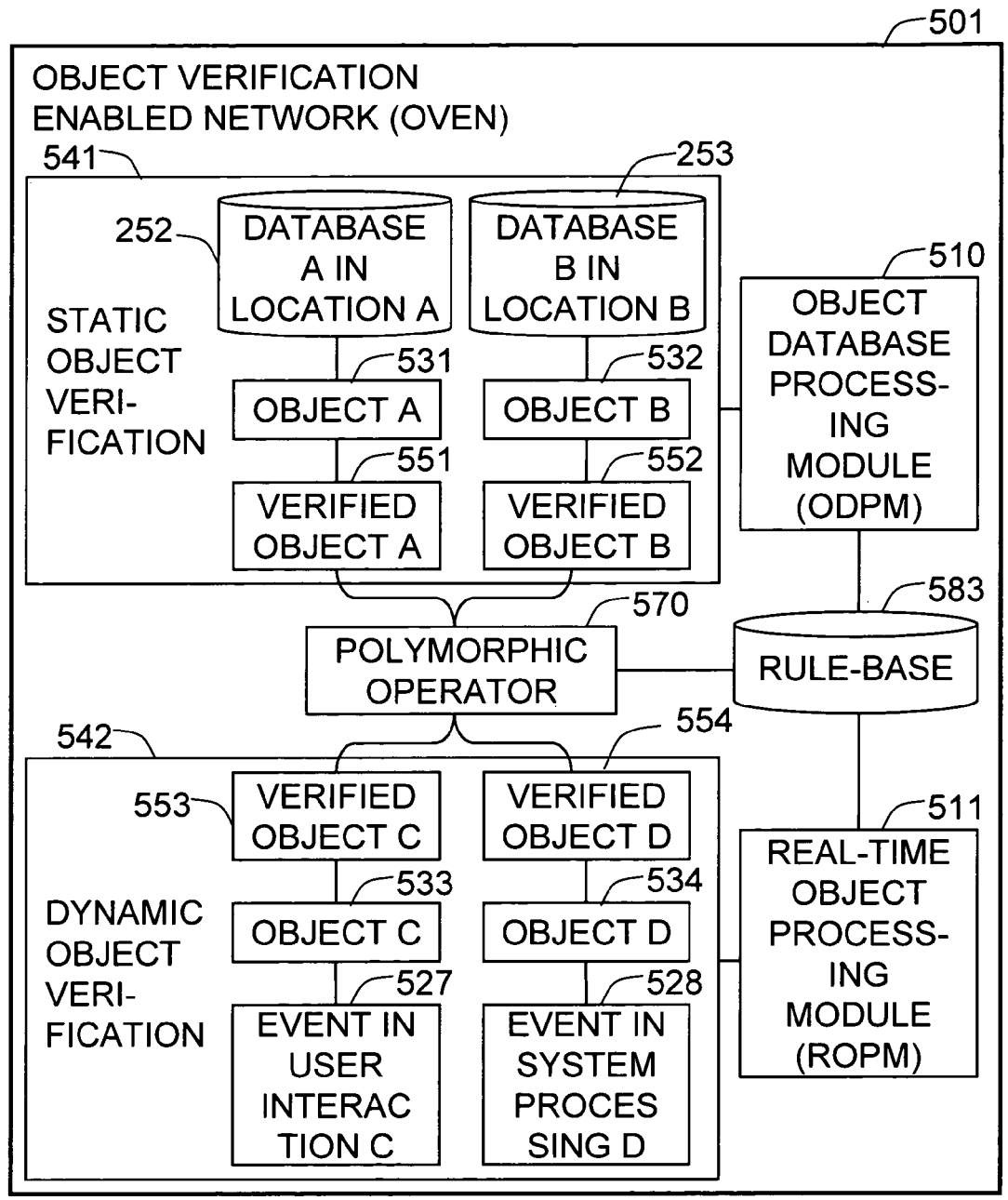
FIG. 1 shows an exemplary architecture of the Object Verification Enabled Network (OVEN).

FIG. 1 shows an exemplary architecture of the Object Verification Enabled Network (OVEN) 501. The OVEN is a method and system for handling complex data and event in an information processing system through verification process for the information unit, called the "object", based on the data and the event, comprising the following steps of:
  converting the information unit into a verified object,
  expressing the verified object by object representation, and
  processing the verified object through a processing structure, called a polymorphic operator 570, based on the predefined rules in a particular application domain.

The predefined rules can be stored in a rule-base 583 in an exemplary embodiment as shown in FIG. 1.

Object Verification Enabled Network (OVEN)

From one point of view, the Object Verification Enabled Network (OVEN) 501 comprises a way to augment information units and to process the information units through a processing structure, called a polymorphic operator 570, in an information processing system, such as a multimodal human computer interaction (HCI) system. In the present invention, the information unit is also called the "object".

The information unit is converted into a "verified object". A processing structure, called a polymorphic operator 570, processes the verified object, based on the predefined rules by the expert user in a particular application domain. The processing and semantic structure of the OVEN provides a nice computational framework for an information processing system that needs to handle complex data and event in the system.

A particular embodiment of the OVEN is a collection of networked modules, so that the present invention can extend the information processing system, such as the multimodal HCI paradigm, to embrace the domain of web-based applications along with the standalone applications. In this embodiment, the OVEN uses remote resources, such as a remote database, in the network environment by a remote verification process for the objects that appear in the network.

In an exemplary embodiment for a multimodal HCI system, the OVEN can utilize the strength of the multimodal HCI system in the distributed web environment. One of its embodiments in such environment is realized as a web application, which facilitates multiple user interaction with multiple languages in a highly distributed computing environment.

One of the objectives of the OVEN is to provide a tool for defining semantics to each event encountered in an interaction with a multimodal HCI system. With the growing complexity of the web environments, the need for a tool that assigns appropriate semantics to each object is also increasing. Usage of such tool will enable the expert user to construct a well-organized data structure, which will eventually expedite the information processing.

The information sources, or flows in the OVEN, are not necessarily context dependent. In the case of processing contextual information, the OVEN does not have any assumption that the information comes from only human users. Thus, the concept of "intention" or "attention" is treated no differently from other contextual information in the OVEN.

Object As Information Unit Based On Data And Event

Among many different types of information units, the following descriptions in this document will focus on the information unit based on data and event.

First, the object can be an "information unit based on data" 521, which can appear in the input modalities, output representation, or internal processes within the system handled by the processor.

Second, the object can also be an "information unit based on event" 522. The creation of information pieces is often event driven. The OVEN treats each single event, or a combination of such events, as an individual object.

Information Unit Based On Data

As an exemplary information processing system, when a multimodal HCI system processes speech recognition, it applies a speech recognition algorithm through a speech recognizer to the speech signal. The recognized speech segments are understood based on grammar files.

Likewise, when the multimodal HCI system processes a sequence of captured video images, the two-dimensional array of image data stored in a memory space is passed to the processor, which applies computer vision algorithms to the data.

These input modalities essentially create information pieces based on the data with which the system understands the user's command and possibly intention in the semantic level.

From the output modality point of view, a certain kind of response or feedback is given to the user. Visualization of the pre-stored output data, such as graphics, or textual messages, is one of the ways to send the information piece to the user. Audio instruction, such as a .wav file in a memory space, is another example of output information delivery. In this case, the information is created based on the input and output data.

Some information pieces are created internally by the internal processes within the system, without involving a direct input or output process between the system and the user or as a result of the interaction between the system and the user. For example, when an input is gathered and processed, the processor can create a message, which contains a data member for the processor's internal processing. Queried data from a database by the system in an automatic procedure also belongs to this category.

In the OVEN, all of these information units, which appear in the input modalities, output representation, or inner processor processing steps, are regarded as the object, i.e. "information unit based on data" 521.

Information Unit Based On Event

Second, the object is an information unit based on event 522. The creation of information pieces is often event driven. The OVEN treats each single event, or a combination of such events, as an individual object. The definition of event in the OVEN includes any computing processes, which comprise the following:
  Result of a process, such as the return value of a function,
  Relevant attributes to a data,
  Concept derived by executing a procedure in the application, like contextual information,
  Functionality of the process, and
  Relationship among the processes.
  The event can be triggered by
  user interaction and direct command,
  the system for the user interaction, as in a feedback, another process, as in a callback function,
   another interaction by another user in a multiple user interaction situation,
   the resultant process derived from the parent composite events, or
   the processing instruction for a data piece from a network.

The definition of the object is abstract, but the embodiment of the abstraction can exist in any computer accessible media form, such as in textual, numerical, visual, or audio form. The embodiment can exist in a local system or in a distributed database remotely. One good example of the embodiment of the object representation is a XML-based data message file, which contains relevant information for an event. In another example, when a speech segment is not recognized, the system can apply contextual information in order to guess the speech segment based on the history of interaction. In this case, the fact that the speech segment is not recognized, the fact that the system can apply contextual information to the speech segment, and the fact that the system maintains a history of interaction, can be defined as events. In a system, these events can be embodied into a message with Boolean value or a real numbered value providing the measurement for the degree of confidence for the events. These types of information based on the events are examples of the objects in the OVEN.

We used the term "object" rather than information or event for the concept, because the object is an augmented information unit in the OVEN. The augmentation of the object is done by a verification process in the OVEN. This differentiates the object in the OVEN from a simple information piece or event in an information processing system in general. Furthermore, the term "object" is clearly different from that of the object-oriented programming. The object in the OVEN does not have anything to do with data encapsulation, inheritance, or instantiation.

The exemplary embodiment shown in FIG. 1 shows that an object, such as "object A" 531, from a "database A in location A" 252 and another object, such as "object B" 532, from a "database B in location B" 253 are verified as the "verified object A" 551 and the "verified object B" 552, respectively. If the verification is processed offline on these data, the process can be called a "static object verification" 541 process, and Object Database Processing Module (ODPM) 510 can be an exemplary software module that helps the static object verification 541 process.

The exemplary embodiment also shows an exemplary "dynamic object verification" 542 process, which can be facilitated by a software module called "Real-Time Object Processing Module (ROPM)" 511. In the exemplary embodiment, the "dynamic object verification" 542 process can verify an exemplary information unit based on event 522, such as an "object C" 533 from an "event in user interaction C" 527 and an "object D" 534 from an "event in system processing D" 528, into verified objects, such as "verified object C" 553 and "verified object D" 554, respectively, in real-time.

Figure 2:
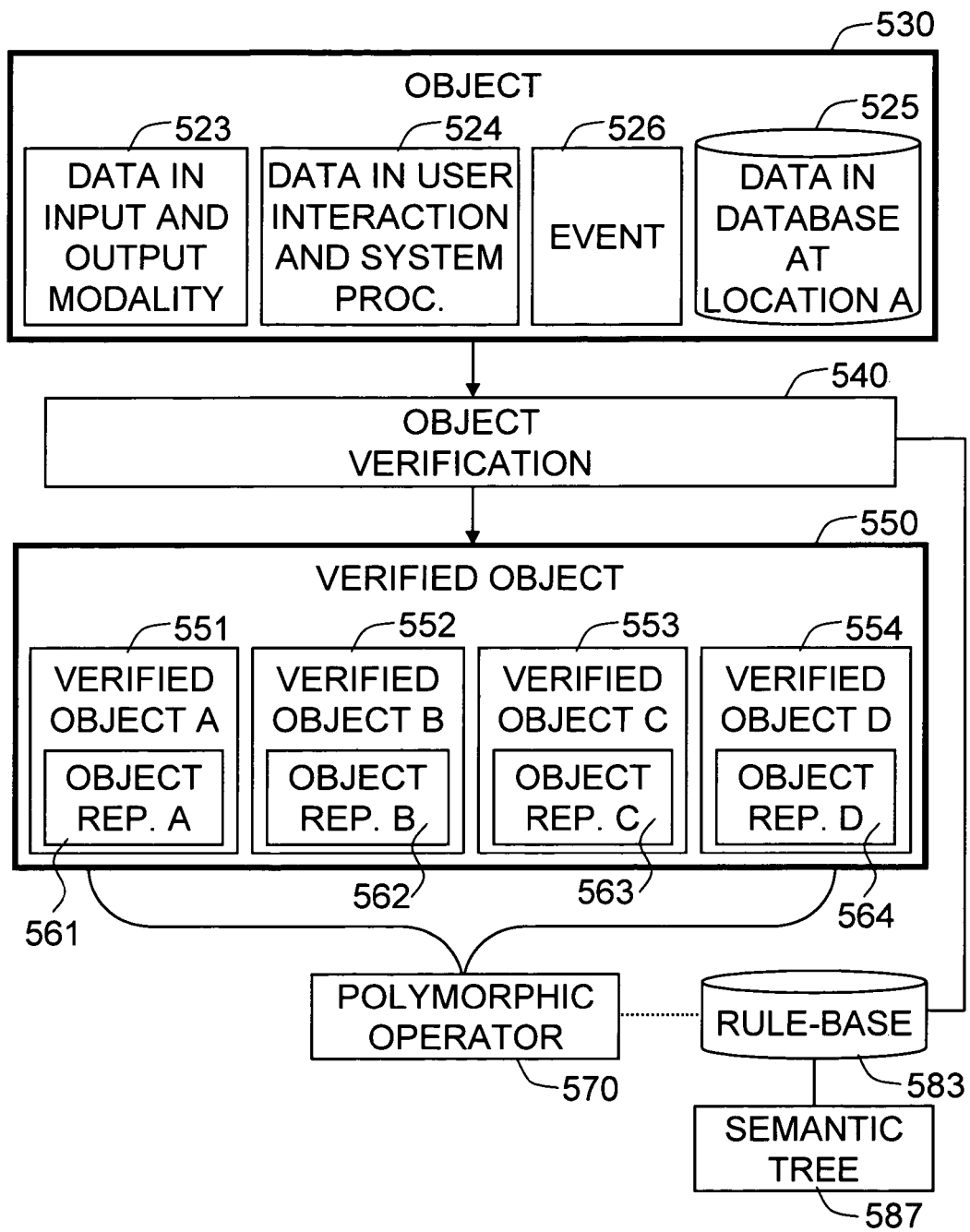
FIG. 2 shows the object verification process of multiple verified objects for various types of information units that reside locally or remotely.

FIG. 2 shows the object verification process of multiple verified objects for various types of information units that reside locally or remotely.

Object Verification

The information unit is converted into a "verified object" 550, through a verification process in the OVEN. The verification process is a step to give the object an additional meaning based on the characteristics of the object, in which the additional meaning is eventually intended to be the essential meaning or goal-oriented meaning of the object for a particularly intended application domain.

One assumption is that the information unit based on data 521 or information unit based on event 522, i.e., an object, may not represent the object's most desired characteristics by itself, especially when the application domain, where the information unit is processed, varies. For example, the information sometimes reveals its most appropriate meaning to the goal of the target process only when the contextual attribute to that information is known. Therefore, the object needs to be augmented with the precise key idea, which helps the object to behave and be utilized as it is truly intended.

Another assumption is that the information in the object also needs more intelligent definition in order to make an application to behave more dynamically. The object can contain processing information, not member functions, inside itself, which tells how the information in the object is to be treated. For example, the information can contain processing information for its contextual attribute. The step for augmenting the object with this kind of additional meaning and making it more intelligent, in a sense, is called the object verification (OV) 540 process in the OVEN.

The exemplary embodiment in FIG. 2 shows that the object verification 540 process for multiple verified objects, such as the exemplary verified objects, "verified object A" 551, "verified object B" 552, "verified object C" 553, and "verified object D" 554, can be performed from various types of information units that reside locally or remotely, such as "data in input and output modality" 523, "data in user interaction and system processing" 524, "data in database at location A" 525, and "event" 526, which could possibly be created locally or remotely, with the exemplary object representations, such as "object representation A" 561, "object representation B" 562, "object representation C" 563, and "object representation D" 564, respectively.

Figure 3:
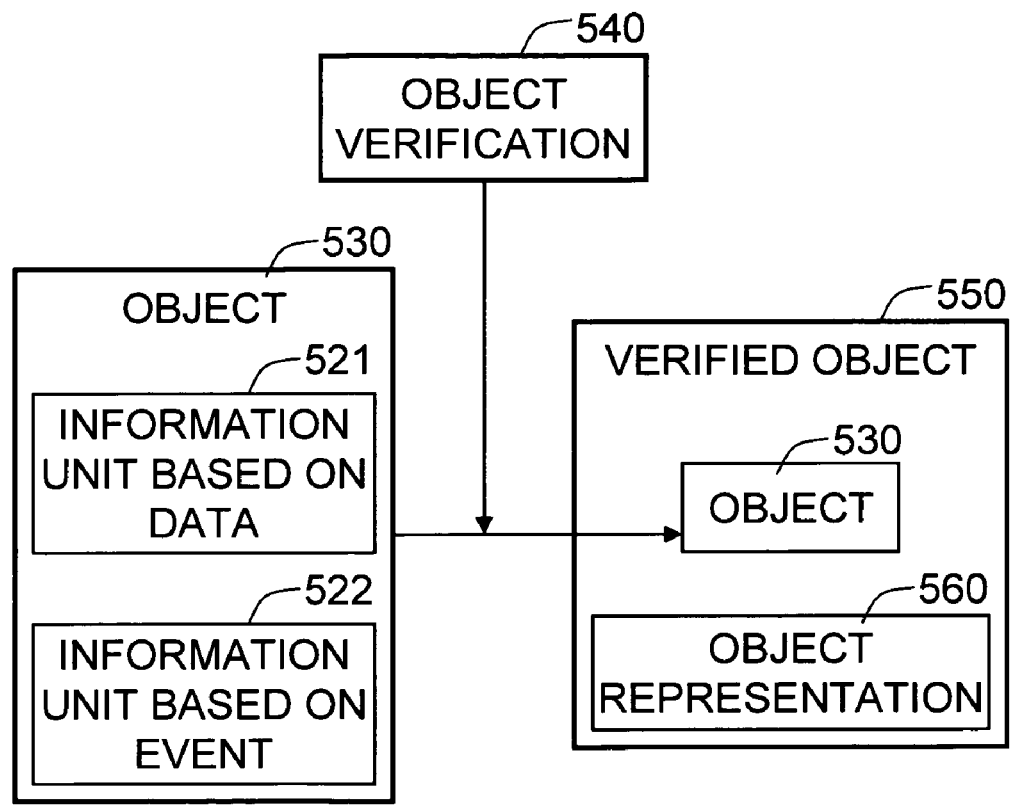
FIG. 3 shows an exemplary single object verification for an object and relationship among object, verified object, object representation, and object verification process.

FIG. 3 shows an exemplary single object verification for an object and relationship among the "object" 530, the "verified object" 550, the "object representation" 560, and the "object verification" 540 process.

In the object verification 540 process, the main characteristics of the object 530 are represented in a single set of the verification information in the verified object 550, and this representation is called "object representation" (OR) 560. The object representation 560 shows the key concepts of the object 530 as the result of the verification, whether the object 530 is a simple object or a composite object, i.e. a collection of simple objects. The object representation 560 does not include the object 530 itself, but it is the representation for the object 530 according to the verification. The embodiment of the object representation 560 can be just a name of the object 530 in the simplest form, or it can be a collection of important characteristics of the object 530 in a literal form.

The process for constructing object representation 560 might look similar to the process for finding a key in a disjoint set data structure. However, the object representation 560 could comprise heterogeneous data types in a higher-level data structure. For example, entire key concepts of the object 530 can be represented in one composite object representation 560. On the other hand, only a partial concept of the object 530 can also be used as the object representation 560.

As mentioned earlier, the concept of object 530 and object representation 560 is different from the object in the object oriented programming. As said earlier, there is no concept of instantiation for the object 530 in the OVEN. The object representation 560 is different from the concept of instantiating an object from a class in the object oriented programming practice, where one or a plurality of member data and functions are included as the definition of the class. The object representation 560 can follow a class-like data structure as a guideline or conventional protocol to form the object representation 560, but it is not an instantiation. Each object 530 in object representation 560 is regarded as unique, so there is no concept of sibling objects instantiated from a parent class or assignment among the objects. If they have exactly the same representation, then they are regarded as the same object 530.

The XML and XML Schema are one of the exemplary tools that can be used to implement the object representation 560 for the verified objects and the other concepts of the OVEN in an exemplary embodiment of the present invention. As said, one exemplary usage of the XML is the exemplary embodiment of the object representation 560 in a XML-based data message file, which contains relevant information for an event or the verified object 550 in general. However, the key approach and interest in the object representation 560 in the OVEN is more related to the representation of the semantics or meaning of the object 530 into a verified object 550 by giving the object 530 an additional meaning based on the characteristics of the object 530. Thus, the concepts of formatting in a data document or transformation in the XML are less relevant to the object representation 560 in the present invention. Unlike the XML Schema, the object representation 560 in the OVEN does not have a predefined set of built-in datatypes. A verified object 550 has a single set of the verification information, and each verified object 550 is regarded as a complete single unit by itself. Although a verified object 550 can contain processing information or type information of the verified object 550 as a part of the verification information, they are not member function or built-in datatype.

Figure 4:
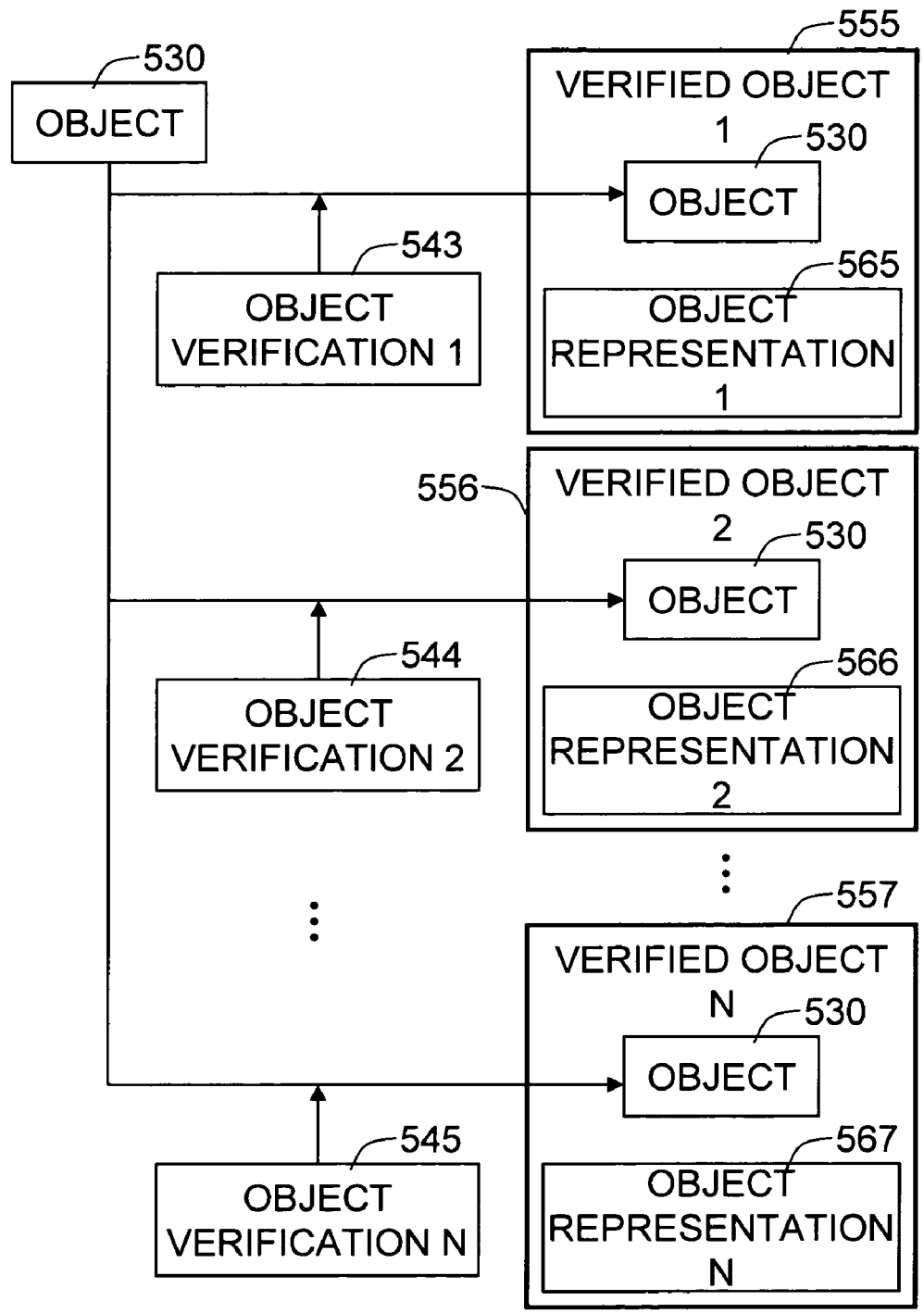
FIG. 4 shows exemplary multiple object verifications for an object.

FIG. 4 shows exemplary multiple object verifications for an object.

The object verification 540 process may need to define an object 530 in multiple concepts, thus as multiple verified objects, such as "verified object 1" 555, "verified object 2" 556, and "verified object N" 557 in FIG. 4, depending on the goals of the target processes in the system. In this case, the object 530 can be represented in multiple object representations, such as "object representation 1" 565, "object representation 2" 566, and "object representation N" 567 in FIG. 4, not a single object representation, in multiple verified objects derived from the object 530. Each of the multiple verified objects will have its own single set of the verification information through the multiple object verification 540 processes, such as "object verification 1" 543, "object verification 2" 544, and "object verification N" 545 in FIG. 4. When multiple object representations exist for an object 530, each of the verified objects is treated differently as a separate verified object 550, depending on the object representation 560. Accordingly, their embodiments exist separately in order to avoid ambiguity.

The object verification 540 process is often dependent on the context in which the objects reside, although not always. The information about the context is integrated to the object representation 560, in case the contextual information plays an important role. If the system is intended for dealing with multiple contexts, distinguishing each context becomes important, and they are represented in multiple object representations, as discussed. Depending on their scientific backgrounds, people have various definitions for the meaning of the "context", and there is no restriction on which aspects of the context are used for the object verification 540 process in the present invention.

The object representation 560 can use any human languages for the literal embodiment. For example, the object representation 560 can contain "name" and "type" elements, in English or different human languages, as the representation for a verified object 550. Furthermore, the object representation 560 can use numerical, literal, symbolical, graphical, or any form of data representation, as long as the relationship 584 among the representation is defined by the rule-base 583, so that the polymorphic operator 570 understands the relationship 584 among the object representation 560. Due to this characteristic, multiple human languages can be simplified by the appropriate object representation 560.

In the case of the object based on data, the object verification 540 is performed primarily for the objects that are closely tied to the goal of the application among possibly numerous objects based on data. The object verification 540 for the objects based on data can be done manually by the expert user prior to using the system, unless the database contains verified objects that had been verified previously. In this case, not all of the objects may need to be verified. Practically, it will be difficult to verify entire objects in a database, which appear in an information processing system, especially when the size of the database is huge. Even if the entire object is verified, not all of them may be used. Therefore, the object verification 540 is selectively processed according to the application goal. We refer to this exercise as the "verification on demand". When there is no verification representation in an object 530, e.g., the object 530 may not be a verified object 550, the OVEN treats it as a normal object 530 by default.

In the case of the object based on event, the object verification 540 can be performed automatically by a verification module. For example, when an event is created by the internal processes, such as speech recognition or gesture recognition, the verification module can look at it and verify the event as a verified object 550. As was the case for the object based on the data, it will be difficult to verify entire objects based on events, especially when the processes for creating and handling events are complex. The number and type of objects based on event, to which the verification module can apply the verification, are controlled by the rules according to the application goal.

FIG. 5 shows "an exemplary rule for the polymorphic operator" 571 based on the Boolean logic in a XML file.

Polymorphic Operator

Once the object representation 560 is assigned to each object 530, and as soon as the system recognizes the verified objects, they are sent to the processing module in the system. This can be triggered by the request from the user or the system. Then, the OVEN provides a processing structure, which applies a relationship 584 among the verified objects and produces an outcome from the application of the relationship 584. The processing structure is called the polymorphic operator (PO) 570.

The polymorphic operator 570 can handle both quantifiable and non-quantifiable relationship 584 among the verified objects. The relationship 584 is governed by predefined rules, which are in turn defined by the expert user in a particular application domain, where the system is used. The rule can also define the type and format of the output result caused by the relationship 584. The rules can exist in a distributed network, so they can be referenced by the system remotely.

How the type and format of the output result are created from the input is also defined by the relationship 584 among the verified objects. The polymorphic operator (PO) 570 derives an output based on the relationship 584, which is defined by the rule in the rule-base 583. The rule-base 583 is constructed by the expert user in the specific domain where the system is used. The rules can exist in a distributed fashion in the network, so that a remote rule-base 583 can be referenced by the system.

The rule can define the relationship 584 among the verified objects at either the information content level or the semantic group level, of the verified object 550.

When the rule is defined at the information content level, the PO evaluates the value of the verified objects. When the rule is defined at the semantic group level of the verified objects, the PO compares the object representation 560 of the verified objects to the keywords in semantic groups in the rule.

One exemplary data structure in operating the PO for each semantic group node is the disjoint set data structure. Based on the disjoint set theory, we can group or ungroup the verified objects using the polymorphic operator 570. The derived output does not necessarily have to combine the two disjoint sets, but if the relationship 584 is defined to merge the two or multiple disjoint sets of object representation 560, the disjoint set data structure and its operation is a good exemplary data structure. This will lead to a more complex reasoning after combining a set of objects. In this case, a divide and conquer algorithm-based approach for reasoning the newly created composite object can be used.

Architecture

In an exemplary embodiment for the concept of the PO and its operation, the architecture for the system is designed in such a way that various computational models for the PO can be integrated by the following design principles:

1) The architecture is physically independent from any specific information processing system. It is a standalone library, and it communicates with a domain specific application by an interface.

2) The architecture uses an external data file, such as a data file written in XML, which contains the rule information for the PO. The XML file allows users to define their own rules in the domain specific context. Thus, the computational model in the rules can be changed according to how the rules are constructed in the XML file.

Based on these design principles, the flexibility of the system allows adaptation for various computational models. Regardless of which computational model is used for constructing the PO, the system is designed to provide a framework that connects the driver application to the processing module of the PO.

Once a computational model is selected, the computation is performed through the polymorphic operator 570. The computational model 580 itself can provide rules, which define the relationship 584 among the verified objects and among their corresponding semantic groups. The POs execute the rules onto the object representations, which match the semantic groups.

The operands are organized in a hierarchical data structure based on an abstraction such as a semantic tree, which the expert user can construct. Each operand is treated as a node for a semantic group, a group of semantically relevant concepts, in the semantic tree. The node may or may not have the children nodes.

Based on the domain knowledge, an expert can assign a keyword to each semantic group, which represents the key idea of the semantic group.

As said previously, the rule can define the relationship 584 among the objects either at the information content level or at the semantic group level of the object.

When the rule is defined at the information content level, the PO evaluates the value of the objects. For the numeral entity, numerical evaluation of each entity will be needed, which contributes toward constructing the numerical hypothesis of the "if" conditional statement as a confidence parameter. When the rule is defined at the semantic group level of the objects, the PO compares the object representation 560 of the verified objects to the keywords in semantic groups in the rule.

In "an exemplary rule for the polymorphic operator" 571 for the relationship-based reasoning process of an exemplary embodiment shown in FIG. 5, the basic structure of the reasoning of the semantics is a conditional statement. The "if" segment not only holds unary/binary Boolean logic, but also any number of operands in the Boolean logic. In simple cases, basic Boolean logic relationships are used for the reasoning, such as AND, OR, NOT, XOR, NAND, NOR, and NESTED_IF. We can construct highly complicated logic through the composite of the basic Boolean logic and nested "if" statements. In the exemplary embodiment of the present invention, the NESTED_IF allows one-step deeper reasoning, and further recursive processes in deeper levels are avoided currently.

Figure 6:
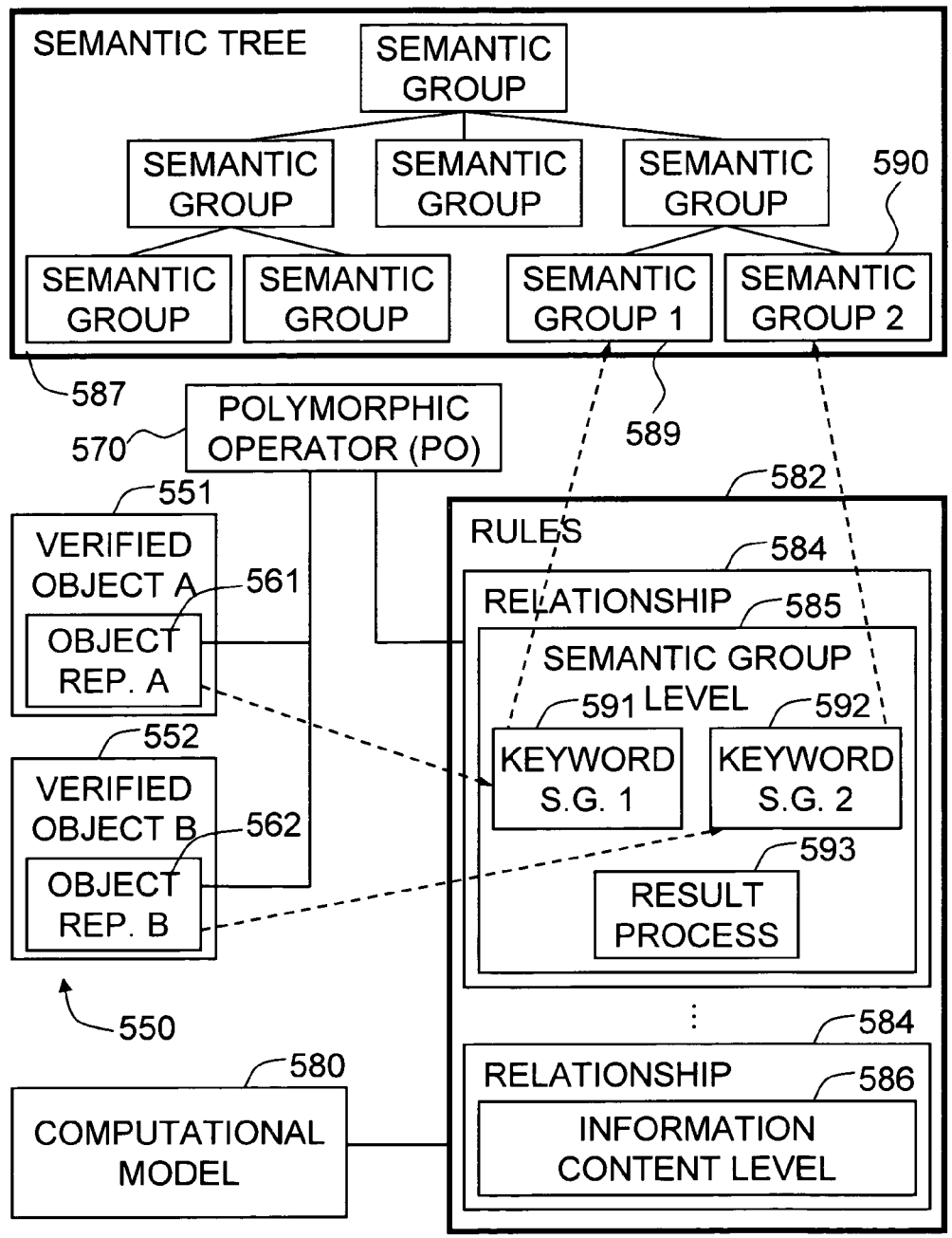
FIG. 6 shows architecture for the application of the rule to verified objects by the polymorphic operator at the semantic group level.

FIG. 6 shows architecture of how the polymorphic operator 570 applies a rule to verified objects at the semantic group level of the object. FIG. 7 shows the "pseudo example of the polymorphic operator" 572 based on the Boolean logic. Evaluation of each entity at the semantic group level of the objects is decided as existential quantification. This can be especially true for the literal entity.

One easy example, which shows how the PO, rules 582, and semantic groups work, can be found in a speech recognition process. In general, the number of vocabularies for the speech recognition used in the interaction is restricted, based on the expert knowledge in the domain. It will be meaningless to issue arbitrary commands in the interaction between users and a multimodal HCI system, since the system will not understand the arbitrary commands. In addition to this, the environment, where the exemplary information processing system for the speech recognition is used, is often domain specific, in which only a restricted number of vocabularies are most relevant to the application. When the object representations of verified objects contain these vocabularies, they can be matched to the keywords in semantic groups.

In an exemplary embodiment shown in FIG. 6, an exemplary PO, such as the "pseudo example of the polymorphic operator" 572 in FIG. 7 can apply exemplary rules 582 in an XML file, such as "an exemplary rule for the polymorphic operator" 571 in FIG. 5, to the exemplary verified objects, "verified object A" 551 and the "verified object B" 552.

In an exemplary embodiment shown in FIG. 6, in order for the POs to apply the rules 582 in an XML file, the operators first match the object representation 560, such as the "object representation A" 561 and "object representation B" 562, to the keywords, such as "keyword for semantic group 1" 591 and "keyword for semantic group 2" 592, in the semantic groups by the pattern matching process. Then, they perform relationship-based reasoning based on the "semantic group level relationship" 585. The "result process" 593 is the result of applying the relationship 584 in the rules 582, and it can be a simple result or lead to a further process as defined in the rule.

Pattern matching is a mapping of the keywords to semantics (partially based on concepts in discrete mathematics). Some exemplary types of pattern matching can be as follows:

Many to 1 mapping: different keywords are mapped into a single meaning.

Hierarchical mapping: same keywords have different meaning, depending on the level where the keywords are used in the hierarchy.

Chronological mapping: previous mapping influences on the current mapping.

In our current implementation, an exemplary rule is constructed based on the Boolean logic as shown in the exemplary embodiment in FIG. 5.

The semantic tree is an abstraction, and it is used as a basis for defining the relationship 584 in the rules 582. The data structure of the semantic tree can be Hash, linked list, or tree. A mapping function, similar to a hash function, can be used to match the keyword pattern in the data structure. In our exemplary implementation, a tree is used as the data structure. In the data structure, each node represents a semantic group. One thing to notice here is that the keyword pattern matching is primarily processed at the semantic group level, not the individual semantic level. It is like finding a "representative keyword" in the disjoint set where the "target keyword" belongs.

One exemplary data structure of each semantic group node can be the disjoint set structure. According to the disjoint set theory, we can group the semantic group or ungroup the semantic group using the Boolean logic operator. The "grouping" means merge of the multiple nodes in the tree into one semantic group node. This will lead to a more complex reasoning after combining a set of basic Boolean logic. In other words, we can devise a divide and conquer algorithm-based approach for reasoning complex semantics.

In this computational model 580, the process going from "pattern matching" to "relationship-based reasoning" facilitates the fusion of multiple input modalities, whereas the other way, which is explained in the following sections, facilitates the feature level recognition processes.

Figure 8:
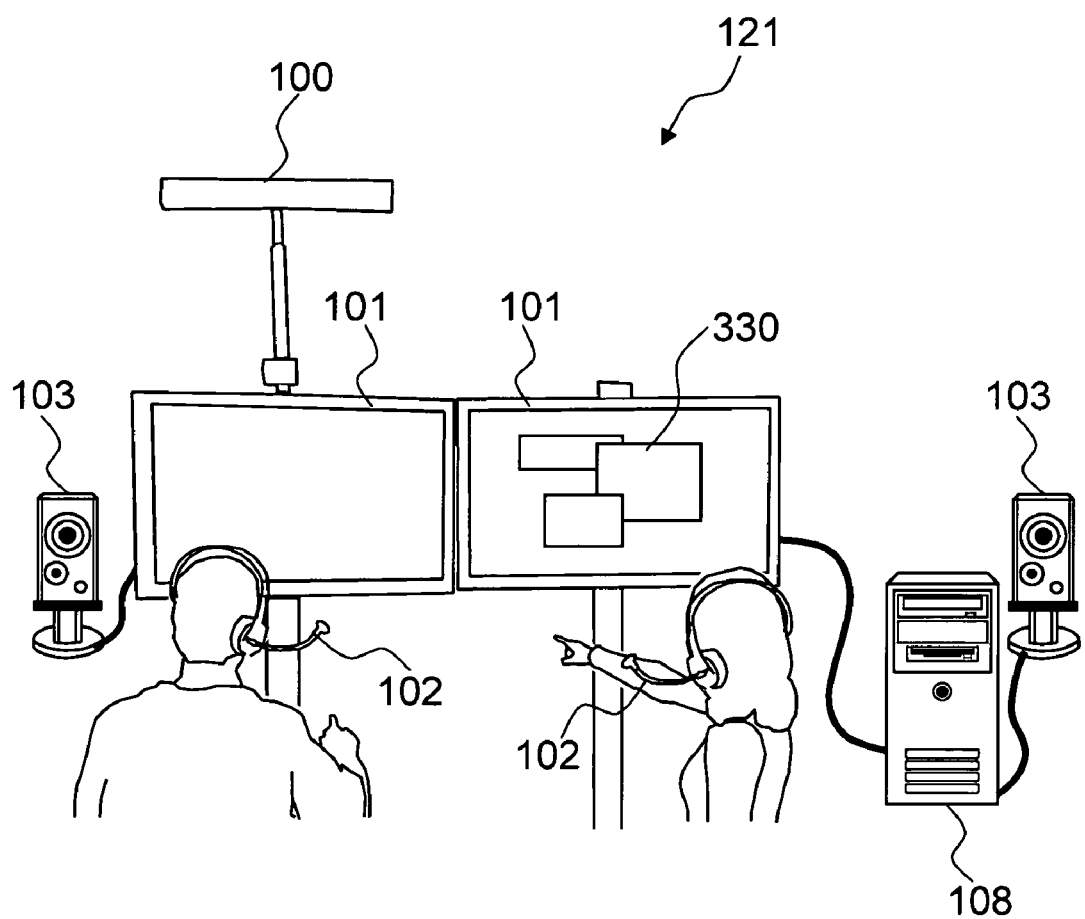
FIG. 8 shows an application of the OVEN.

FIG. 8 shows an application of the OVEN to an information processing system 121, such as a multimodal human-computer interaction (HCI) system. As shown in FIG. 8, a typical exemplary embodiment of an information processing system 121, especially a multimodal human-computer interaction (HCI) system, can comprise "means for capturing images" 100, "means for displaying output" 101, "microphone" 102, "speaker" 103, and "control and processing system" 108.

Application of the Object Verification Enabled Network

This section discusses exemplary applications of the OVEN.

First, it discusses how the OVEN can be used for a reasoning process in a multimodal HCI system, which applies contextual information to the key processes in the system.

Second, it discusses how the OVEN can be used for semantic correlation in a multilingual information processing system.

As mentioned, the fusion of the multiple inputs from different modalities is one of the most important processes in a multimodal HCI system, and the OVEN can provide a framework to help in the fusion process. From the first exemplary application, how the OVEN can be used for the fusion of gesture and speech information can be easily derived and understood.

Handling many practical challenges found in the key modalities, such as gesture and speech recognition in a commercially working multimodal HCI system, is also one of the areas where the OVEN can contribute. As an example, some of the challenges we have found in the gesture recognition, face detection/tracking, and hand detection/tracking technologies, are as follows:

The system should be able to capture and process the input image sequences at a reasonable frame rate in order to handle the real-time interaction and information processing, e.g., 15-30 frames per second (fps), without losing the image details, i.e., issues in speed vs. size of the imagery data.

Automatic resolution adaptation is sometimes needed due to the imprecise location of the user stance in front of the system or moving target object in the field of view. For example, the user might stand too close or too far away with regard to the proximity to the system interaction space.

Automatic initialization, which does not require a user's cumbersome involvement, is another difficult but necessary element in the system design.

Ideally, no threshold or no fixed size template should be used to make the system flexible enough for the environmental situations and user changes. In practice, this seems very difficult to achieve due to high variation in the situations. Therefore, adaptive algorithms are preferred for the technologies in order to meet this goal if such algorithms are available.

The system should be tolerant of noises and lighting variations in the environment.

The system should be intelligent enough not to be dependent on specific user characteristics, such as different skin color, height, or shape variation. For example, shading caused by surrounding objects or by the user him/herself can change the shape and color of the target object, such as different postures for hand gesture recognition, or nose shade for facial feature recognition.

Cumbersome training requirements for using the system should be avoided. This goal is also closely related to the issues of designing the application contents and the transition of the states in the contents.

Controlling the unexpected obstacles, which hinder the fundamental computer vision algorithms from being applied to the primary target object as expected, is also another difficult problem to solve. For example, if the color of the floor mat, within the field of view, is similar to the skin color, the skin color-based face/hand detection and tracking algorithm goes into greater danger of failure. Artifacts in the background, similar to the target object, could also pose a problem.

Based on our experience for a multimodal HCI system development, we found ad-hoc solutions, such as introducing additional parameters, thresholds, conditions, or error handling pieces of code, are sometimes used as quick solutions to the challenges in a real-world environment. However, the ad-hoc solutions are often non-scalable and inconsistent from one system to another.

The OVEN can provide a robust, scalable, and organized framework, which efficiently integrates these ad-hoc solutions into a manageable tool.

One of the strengths in the multimodal HCI system, compared to the traditional interface, is the capability of direct access in descriptive commands, which expedites the information access and handling, as discussed in R. Sharma, et al., Speech-gesture driven multimodal interfaces for crisis management, Proceedings of the IEEE, Volume 91, Issue 9, September 2003 Page(s): 1327-1354 (hereinafter R. Sharma, et al.).

A multimodal HCI interface can greatly ease the process, by providing additional modalities for interpreting the objects. For example, a voice command, "Show me the result of applying the polymorphic operator PO1 from object class A1 to object class A8.", along with gestures pointing to the object class A1 representation and object class A8 representation, is more efficient than using a keyboard or mouse, in getting the same result by directly accessing the related objects in a more descriptive way. The multimodal HCI system parses and understands the descriptive commands automatically, and processes the sequence of information in a much faster way, which would have taken much more cumbersome intervening steps from the user if it were not facilitated by the multimodal HCI system.

In using an HCI system with a large database, users often suffer from the disorganization of data, not from the lack of data, which leads to the importance of data organization and mining.

The strength of the multimodal HCI system for accessing huge amounts of data rapidly with direct access for descriptive commands can maximize the performance of handling huge amounts of data, not to mention the benefit in the data mining area. In order to have this advantage and successfully integrate the multimodal HCI system to a complex database, we need an intelligent integration tool. The OVEN can provide an efficient and intelligent tool for this application, including the data mining area, since object verification 540 is also closely related to data construction and how to model data.

Application Of The Contextual Information In Fusion Of The Multimodal Inputs

In addition to the effort for better numerical algorithms, attempts for utilizing contextual information for multimodal inputs can be beneficial in enhancing the performance of the multimodal HCI system. The OVEN can provide a scalable and powerful framework for the attempt. In FIG. 8, the system uses reasoning modules to apply contextual information to the processes, the set of handlers, in the system based on the OVEN.

Depending on their scientific backgrounds, people have various definitions for the meaning of the "context". The definition of the context in the application is defined as any quantifiable and non-quantifiable information, which could characterize the object and influence the way the object is understood and applied to a particular multimodal HCI system in a specific domain. There are many different aspects of the context, such as "geo-spatial", "visual", "geometric", "temporal", "relational", "history of interaction based", "conversational", "social", "human relationship based", "behavioral", "cultural", "physical", "system based", "environmental", "scheduled/planned", and "situational". There is no restriction on which aspects of the context are used for the OVEN.

FIG. 9A and FIG. 9B show exemplary processing sequences and conversational segments of a particular interaction, part A 230 and part B 231, in an exemplary application of the OVEN. In the exemplary conversational segment of a particular interaction with a multimodal HCI system, FIG. 9A and FIG. 9B, a multimodal HCI system partially did not recognize the user's speech at Time: $t_{k+1}$ in part B 231, i.e., the speech was not defined in the grammar, and it tries to recover the missing part by the help of a reasoning module, which is in charge of applying the contextual information to the processes in the example. Without such a reasoning module, the system will probably have to result in the steps for error handling, such as asking the user to speak again, or remain silently until the user gives a further command or takes another action to the system. The reasoning module can be structured in such a way that it knows what to do when there is missing information associated with the keyword "highlight", by looking at its keyword semantic class, contextual type, and format in the pattern matching process. The polymorphic operator 570, previously mentioned in this document, can be dynamically defined by the generic computational model so that the matching can be applied to various information pieces in different contexts among different applications.

FIG. 10 shows an exemplary structure for semantic grouping of keywords 594, its registered keywords, and the syntactic format. In this example, the deictic gestures are divided into spatial, symbolic, and textual types, depending on the context. The internal process with temporal task in the semantic group 2 is an example, whose contextual reasoning is not directly involved with human interaction/conversation. The reasoning module can apply the contextual information to any processes in the application as in this example. The speech segment with temporal task in the semantic group 2 is connected to the associated temporal information, rather than a direct temporal keyword or information.

FIG. 11 shows exemplary rules 582 for processing a command using spatial/gesture contextual information and conversation contextual information.

The reasoning module looks up the "highlight" in the table of keyword class, and tries to find a match between the speech command and the available format of the keyword. Once there is a match between them, the reasoning module gives a clue for the missing information. In the exemplary table for the structure for semantic grouping of keywords 594 in FIG. 10, the available and matching pattern will be Highlight {Spatial Info} or Highlight {Symbolic Info}. Using the history of the conversation at Time ti, the module extracts the information about the context of the speech command, and it knows the "highlight" command is more appropriate for the format of Highlight {Spatial Info}. The system also knows that the user's gesture at Time: $t_k$ indicates that the {Spatial Info} can be known by the Gesture Type: "Point gesture", Coordinate (s): $X_k, Y_k$, Time: $t_k$. Using these context-based information, the reasoning module can propose the missing information as semantically equivalent to "this area" at position Coordinate (s): $X_k, Y_k$, at Time: $t_{k+1 \sim k+2}$. The system does not have to know the "this area" speech segment exactly, since the command keyword, "highlight", and the point gesture coordinate, $(X_k, Y_k)$, are known, and their semantic relationship is defined by the exemplary rule. At this point, the reasoning module notifies the visualization module, which takes care of the visualization of the system to show the result at Time: $t_{k+3}$. The reasoning module only provides the contextual information to the corresponding visualization module component, which handles the process. It does not do the actual processing. In this exemplary application, the exemplary rules 582 used by the polymorphic operator 570 can be as shown in FIG. 11.

Semantic Correlation In A Multilingual Multimodal HCI System

We have been developing an approach for integrating multiple human language speech recognition and understanding into a multimodal HCI system. The exemplary multilingual information processing system synchronizes and correlates the semantics from the multiple speech recognition results through a semantic correlation module (SCM), which is based on the OVEN. The processing and semantic structure of the OVEN provides a nice computational framework for the SCM of the exemplary multilingual information processing system. Especially, it facilitates complex multiple user interaction in a highly distributed computing environment for the exemplary multilingual information processing system. It also facilitates understanding the multilingual information from the multilingual speech segments.

In general, the differences in grammars, vocabularies, idioms, expressions, and the existence of homophone, homograph, or polysemy in human languages make the semantic extraction process very difficult. Correlation of the extracted semantics can become even harder. In the exemplary multilingual information processing system, the SCM extracts semantics from the recognized speech segments and verifies the recognized speech segments into the verified objects. Then, the SCM correlates the verified objects according to predefined rules 582 for the verified objects.

In the SCM, the rules 582 for the semantic correlation are defined by the object verification (OV) 540 and relationship 584 among the verified objects. The OVEN provides a file that defines the semantic correlation to the SCM. The SCM constructs a semantic tree based on the file, as an embodiment of the semantic tree abstraction. The data structure enables the SCM to traverse the nodes in the semantic tree for mapping the recognized speech segments to the nodes for the semantic units. The breadth first search is the primarily search method in the exemplary embodiment. Based on the semantic correlation defined in the semantic correlation file, the SCM follows the processing instruction for the mapped semantic units. When two or more semantic trees need to be merged, each tree is regarded as a disjoint set, and the merge follows that of the disjoint set data structure as also discussed earlier.

While the above description contains many specificities, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for handling a plurality of information units in an information processing system through verification process for said plurality of information units, comprising the following steps of:
    a) converting each information unit in said plurality of information units into verified object by augmenting a first meaning in said information unit with a second meaning,
    b) expressing the verified objects, converted from said plurality of information units, by object representation for each verified object,
    c) constructing a processing structure that is capable of applying a plurality of relationships among said verified objects,
    d) applying said processing structure to said verified objects to handle said plurality of information units according to the relationships,
    e) handling rules that exist in a distributed network,
    wherein the rules are used to construct the processing structure that applies the relationship, defined in the rules, among the verified objects, and
    whereby the rules can be referenced by the information processing system remotely, and
    f) using a semantic tree as a basis for defining the relationship in the rules,
    wherein the information units are based on data or event in the information processing system, and
    wherein the verified objects are semantically augmented information units.

2. The method according to claim 1, wherein the method further comprises a step of converting each information unit of the plurality of information units based on data or event in the information processing system into verified object by augmenting the first meaning in said information unit with a second meaning.

3. The method according to claim 1, wherein the method further comprises a step of representing the main characteristics of the information unit in a single set of the verification information in the information unit, whereby the object representation shows the key concepts of the information unit as the result of the verification.

4. The method according to claim 1, wherein the method further comprises a step of automatically performing the object verification of the information unit by a verification module.

5. The method according to claim 1, wherein the method further comprises a step of defining the relationship among the verified objects either at the information content level or at the semantic group level of the verified objects.

6. The method according to claim 1, wherein the method further comprises a step of using the disjoint set structure as the data structure of each semantic group, whereby the semantic group can be grouped as a composite semantic group or ungrouped as a simpler semantic group using the Boolean logic operator.

7. The method according to claim 1, wherein the method further comprises a step of using a collection of networked modules to extend the application to the domain of web-based applications,
    whereby a remote database can be used for a remote verification process for the information unit in the network environment.

8. The method according to claim 1, wherein the method further comprises a step of processing the steps of claim 1 in a distributed World Wide Web environment,
    whereby the method comprises a web application that facilitates multiple user interaction in a highly distributed World Wide Web computing environment.

9. The method according to claim 1, wherein the method further comprises a step of providing a framework that helps the fusion of the multiple inputs from different modalities in a multimodal information processing system using the verified objects and the processing structure,
    whereby the framework can handle many practical challenges found in the key modalities, including gesture and speech recognition, in a commercially working multimodal human computer interaction system.

10. The method according to claim 1, wherein the method further comprises a step of providing a framework that efficiently integrates ad-hoc solutions in an information processing system into manageable tools,
    wherein the ad-hoc solutions include introduction of additional parameters, thresholds, conditions, or error handling pieces of code, into the information processing system.

11. The method according to claim 1, wherein the method further comprises a step of providing a tool for data mining using the object verification and processing structure,
    whereby the object verification and processing structure are closely related to a database construction, how to model data, and how to operate on the stored data in the database.

12. The method according to claim 1, wherein the method further comprises a step of applying contextual information in said information processing system,
    wherein the processing structure is defined in such a way that pattern matching can be applied to various information units in different contexts, and
    whereby the method further provides a framework for applying the contextual information.

13. The method according to claim 1, wherein the method further comprises a step of constructing the predefined rules using the combination of markup languages and Boolean logic, wherein the processing structure handles both quantifiable and non-quantifiable relationships among the verified objects based on the predefined rules.

14. An apparatus for handling a plurality of information units in an information processing system through verification process for said plurality of information units, comprising:
   a) means for converting each information unit in said plurality of information units into verified object by augmenting a first meaning in said information unit with a second meaning,
   b) means for expressing the verified objects, converted from said plurality of information units, by object representation for each verified object,
   c) means for constructing a processing structure that is capable of applying a plurality of relationships among said verified objects,
   d) means for applying said processing structure to said verified objects to handle said plurality of information units according to the relationships,
   e) means for handling rules that exist in a distributed network,
   wherein the rules are used to construct the processing structure that applies the relationship, defined in the rules, among the verified objects, and
   whereby the rules can be referenced by the information processing system remotely, and
   f) means for using a semantic tree as a basis for defining the relationship in the rules,
   wherein the information units are based on data or event in the information processing system, and
   wherein the verified objects are semantically augmented information units.

15. The apparatus according to claim 14, wherein the apparatus further comprises means for converting each information unit of the plurality of information units based on data or event in the information processing system into verified object by augmenting the first meaning in said information unit with a second meaning.

16. The apparatus according to claim 14, wherein the apparatus further comprises means for representing the main characteristics of the information unit in a single set of the verification information in the information unit,
   whereby the object representation shows the key concepts of the information unit as the result of the verification.

17. The apparatus according to claim 14, wherein the apparatus further comprises means for automatically performing the object verification of the information unit by a verification module.

18. The apparatus according to claim 14, wherein the apparatus further comprises means for defining the relationship among the verified objects either at the information content level or at the semantic group level of the verified objects.

19. The apparatus according to claim 14, wherein the apparatus further comprises means for using the disjoint set structure as the data structure of each semantic group,
   whereby the semantic group can be grouped as a composite semantic group or ungrouped as a simpler semantic group using the Boolean logic operator.

20. The apparatus according to claim 14, wherein the apparatus further comprises means for using a collection of networked modules to extend the application to the domain of web-based applications,
   whereby a remote database can be used for a remote verification process for the information unit in the network environment.

21. The apparatus according to claim 14, wherein the apparatus further comprises means for utilizing the means of claim 1 in a distributed World Wide Web environment,
   whereby the method comprises a web application that facilitates multiple user interaction in a highly distributed World Wide Web computing environment.

22. The apparatus according to claim 14, wherein the apparatus further comprises means for providing a framework that helps the fusion of the multiple inputs from different modalities in a multimodal information processing system using the verified objects and the processing structure,
   whereby the framework can handle many practical challenges found in the key modalities, including gesture and speech recognition, in a commercially working multimodal human computer interaction system.

23. The apparatus according to claim 14, wherein the apparatus further comprises means for providing a framework that efficiently integrates ad-hoc solutions in an information processing system into manageable tools,
   wherein the ad-hoc solutions include introduction of additional parameters, thresholds, conditions, or error handling pieces of code, into the information processing system.

24. The apparatus according to claim 14, wherein the apparatus further comprises means for providing a tool for data mining using the object verification and processing structure,
   whereby the object verification and processing structure are closely related to a database construction, how to model data, and how to operate on the stored data in the database.

25. The apparatus according to claim 14, wherein the apparatus further comprises means for applying contextual information in said information processing system,
   wherein the processing structure is defined in such a way that pattern matching can be applied to various information units in different contexts, and
   whereby the means further comprises a framework for applying the contextual information.

26. The apparatus according to claim 14, wherein the apparatus further comprises means for constructing the predefined rules using the combination of markup languages and Boolean logic,
   wherein the processing structure handles both quantifiable and non-quantifiable relationships among the verified objects based on the predefined rules.

* * * * *